United States Patent
Wu et al.

(10) Patent No.: US 6,848,010 B1
(45) Date of Patent: Jan. 25, 2005

(54) DATA COLLISION DETECTION IN NETWORKS

(75) Inventors: Qiang Wu, Portland, OR (US); Donald A. Dytewski, Portland, OR (US); Gregory A. Peek, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,449

(22) Filed: Mar. 31, 2000

(51) Int. Cl.[7] ............................................. G06F 13/00
(52) U.S. Cl. ......................... 710/7; 710/16; 710/33; 710/61; 370/445; 370/447; 370/99
(58) Field of Search ........................... 710/7, 16, 33, 710/61; 370/445, 447; 398/99

(56) References Cited

U.S. PATENT DOCUMENTS

| | | | | |
|---|---|---|---|---|
| 4,745,596 A | | 5/1988 | Sato | |
| 4,751,701 A | * | 6/1988 | Roos et al. | 370/445 |
| 4,965,792 A | * | 10/1990 | Yano | 370/445 |
| 5,390,039 A | * | 2/1995 | Yamamoto et al. | 398/99 |
| 5,657,326 A | | 8/1997 | Burns et al. | |
| 5,936,211 A | | 8/1999 | Kim | |
| 5,940,400 A | | 8/1999 | Eastmond et al. | |
| 6,169,744 B1 | * | 1/2001 | Grabelsky et al. | 370/447 |

OTHER PUBLICATIONS

Copy of PCT Search Report, Sep. 24, 2001.

* cited by examiner

*Primary Examiner*—Jeffrey Gaffin
*Assistant Examiner*—Mohammad O. Farooq
(74) *Attorney, Agent, or Firm*—Robert A. Diehl

(57) ABSTRACT

A data collision detector receives a reflection of a signal from a network and compares the reflection to a representation of a previously stored reflection. Based on the comparison, the data collision detector generates an indication as to whether or not a data collision has occurred.

33 Claims, 6 Drawing Sheets

DATA COLLISION DETECTION IN NETWORKS

FIELD OF THE INVENTION

The present invention pertains to the field of networking. More particularly, this invention relates to detecting data collisions in networks.

BACKGROUND OF THE INVENTION

The number of people using computers, and the types of things computers are used for, seems to increase every day. Computers may soon become as common in day to day life as telephones and televisions. Even today, a typical household or small business is likely to have more than one computer. Networking computers together provides a number of advantages. For instance, even within a household or small business, networked computers can share memory space and share access to resources such as printers and internet connections. Unfortunately, traditional networking approaches have been either prohibitively expense or prohibitively complex to implement for the average household or small business user.

Recently, new products have been specifically targeted for household and small business networking. One approach to these smaller networks uses existing telephone wiring or power line wiring to connect two or more computers within, for instance, a house or office. Most houses these days have telephone jacks in more than one room. Usually, all of the telephone jacks are connected to one phone line leading into the house. If you plug one computer into a telephone jack in one room and you plug another computer into another telephone jack in another room, the telephone wiring provides the network medium, or the physical connection between the computers over which data can be sent and received. Power lines can be used in much the same way if, for instance, two wall outlets are on the same electrical circuit.

Of course, providing the physical network connection is just the first step. Getting the computers to talk to one another over the network connection can be pretty challenging. One basic aspect of network communications is deciding which machine gets to send data over the network and when. Generally, machines can "listen" to data traffic on a network and send data when there is a break in the traffic. If, however, more than one computer is waiting for a break in traffic, more than one computer may send data at the same time when a break is detected. This situation is a "data collision." The data sent by one computer becomes mingled with the data sent by another computer, rendering all of the data unreadable.

In order to stop a data collision, you first need to detect the data collision. One example of a traditional networking approach to data collision detection is used in Ethernet networks. Whenever a machine transmits data onto an Ethernet network, the machine also "listens" to the network. That is, the machine sends data and listens for a reflection of the data back from the network. If the machine "hears" something coming back from the network other than the reflection of what the machine sent, the machine assumes that the unexpected reflection is due to another machine sending data into the network at the same time causing a data collision in the network. In which case, the machine may stop sending data, wait for a period of time, and then try again.

In order to accurately predict what the reflection of a signal will look like, the physical network medium must have known and predictable characteristics. If the characteristics of the physical medium of a network are unknown, or if the characteristics can vary drastically from one network to another, a reflected signal cannot be accurately predicted. In which case, a traditional approach to collision detection, such as the one described above for Ethernet networks, cannot be relied upon for unknown, or "harsh," network environments.

Telephone wiring or power line wiring are examples of harsh network media. The characteristics of these media can vary drastically from house to house, and business to business. Telephone and power line wiring were not designed for network data transmission. Building codes vary from region to region and over time. Wiring may deteriorate over time. Wiring in one house may be 50 years old and wiring in a house right next door may be brand new. Some wiring, particularly older wiring, may be susceptible to environmental changes, like temperature and humidity. Given all the possible variations in characteristics of physical media in harsh networks, signal reflections from these network media cannot be accurately predicted, rendering traditional data collision detection un-usable, and therefore limiting the ability to network devices using such media.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

As discussed more fully below, the present invention performs data collision detection by comparing a current reflected signal to a representation of a previously reflected signal. The present invention can be used to detect data collisions in virtually any kind of network including harsh networking environments where channel characteristics of the network are unknown, unpredictable, and change over time.

Figure 1:
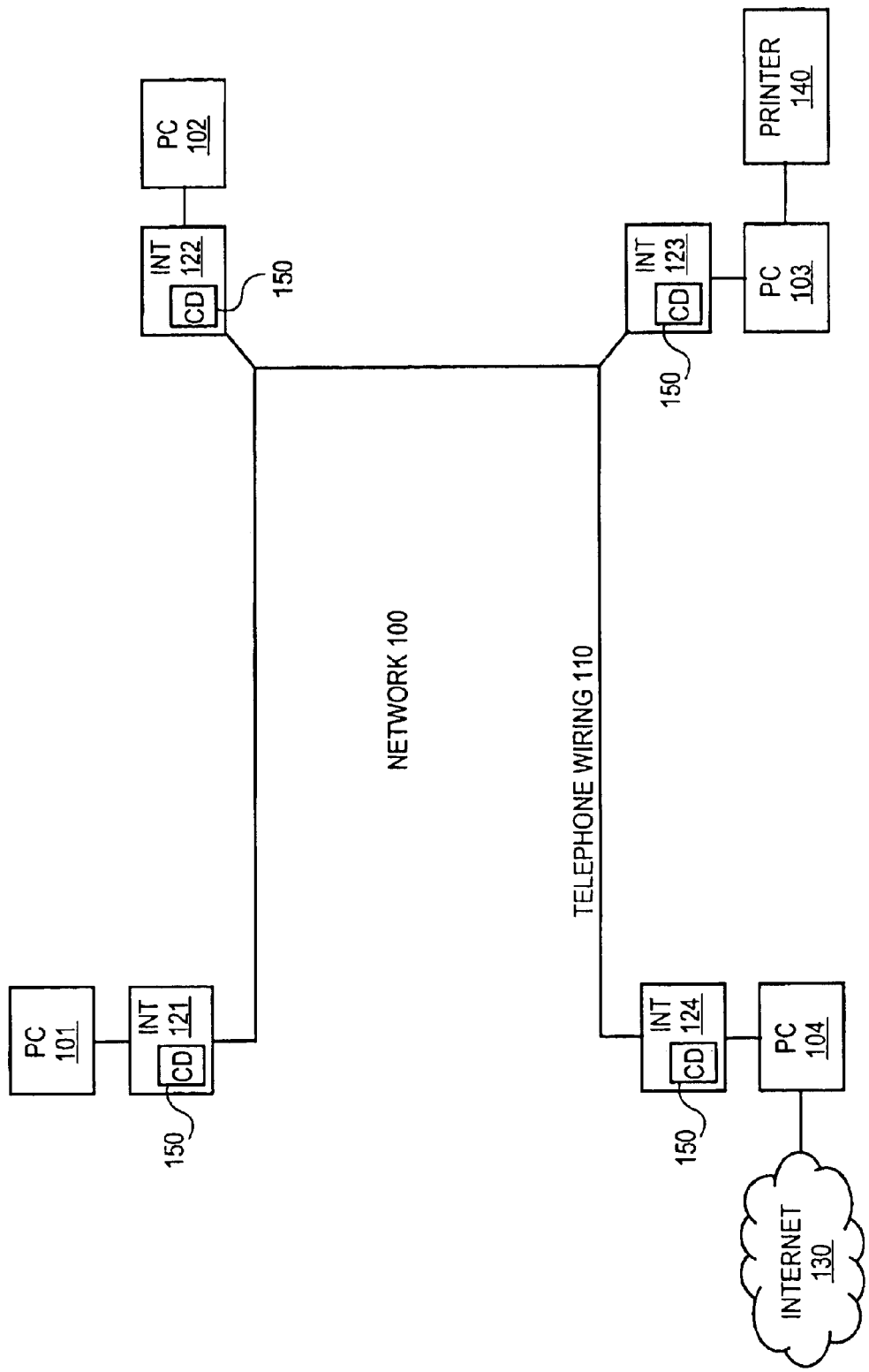
FIG. 1 illustrates one embodiment of a network.

FIG. 1 illustrates one embodiment of a network 100 according to the teachings of the present invention. Four personal computers (PCs) 101–104 are coupled together using telephone wiring 110. Telephone wiring 110 may be wiring in, for instance, a house, apartment, office building, etc. Four network interfaces 121–124 couple the four PCs to telephone wiring 110. Each network interface includes all the functionality necessary to allow PCs to communicate with one another within network 100. By networking the PCs, the PCs can share resources such as access to internet 130 through PC 104 and access to printer 140 through PC 103.

Each network interface includes an inventive collision detector 150. Each time a network interface 121–124 sends a signal into network 100, the signal includes some uniform signal component. For instance, in one embodiment, signals are sent into network 100 in data frames and each frame includes a particular predefined waveform as a preamble to the data.

The collision detector in the network interface that sent the signal into network 100 receives a reflection of the uniform signal component and compares the reflection to a representation of a previously reflected uniform signal component. Assuming the characteristics of the network have not changed substantially from the time the previous signal was reflected, and assuming no other network device is sending a signal into network 100 at the same time, the reflection of the current uniform signal component should substantially match the reflection of the previous uniform signal component. If the reflections do not match, the inventive collision detector 150 will indicate that a data collision has been detected.

An indication that a data collision has been detected may not always mean that a data collision actually happened. If the characteristics of the network change substantially between reflections, the second reflection may not match the first. For instance, adding another network device to the network, removing a device from the network, or damaging the network medium can all substantially change the characteristics of the network and cause a false collision detection. In various embodiments of the present invention however, as discussed below, the inventive collision detector adapts to changes in the characteristics of the network over time.

The uniform signal component may or may not be unique to a particular network interface, and a particular network interface may or may not always use the same uniform signal component. For instance, a network interface may use six different frame preambles. In which case, the collision detector would store representations of all six for comparison purposes.

In alternate embodiments, one or more of the components illustrated in FIG. 1 may be combined or eliminated, any number of additional components may be added, and the components may be networked in any number of configurations by any number of network media.

Figure 2:
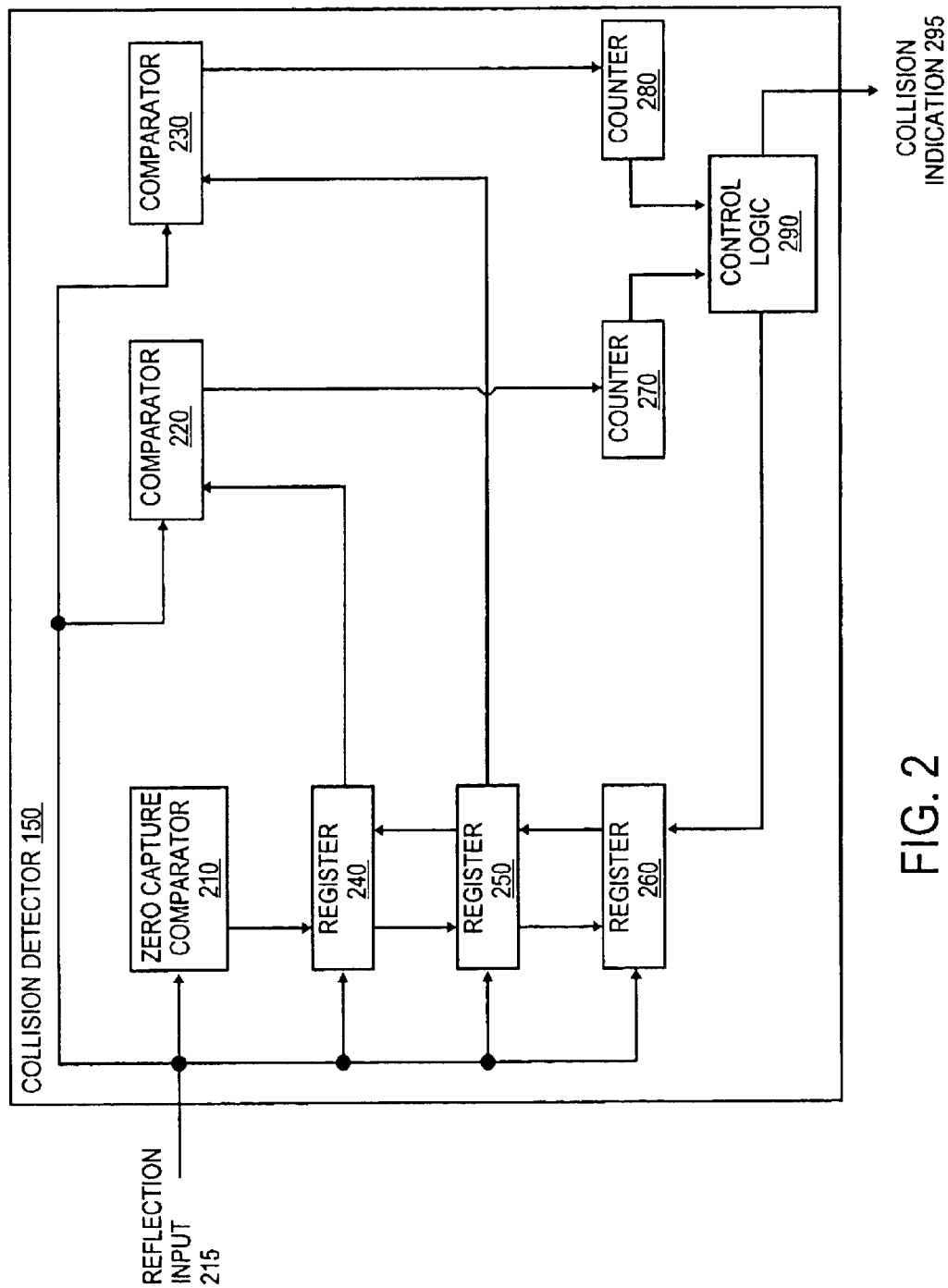
FIG. 2 illustrates one embodiment of a collision detector.

FIG. 2 illustrates one embodiment of collision detector 150 in greater detail. In general, for the first reflection that collision detector 150 receives, it has no previous reflection to compare the reflection to so collision detector 150 cannot make a determination one way or the other. For the second reflection that collision detector 150 receives, it can compare the reflection to the first reflection, but if the reflections don't match, collision detector 150 has no way of knowing if there was a collision during the first reflection or the second reflection. In which case, the embodiment of FIG. 2 works with up to three reflections at a time and operates on the assumption that if at least two out of three reflections match, no data collision occurred for the matched reflections. This is a pretty good assumption because, due to the complex nature of data transmissions on a network and the complex nature of reflections on a network, it is extremely unlikely that two data collisions will produce reflections that match. In alternate embodiments, depending on the nature of the network, a collision detector may work adequately using just two reflections or a collision detector may use more than three reflections.

Figure 3:
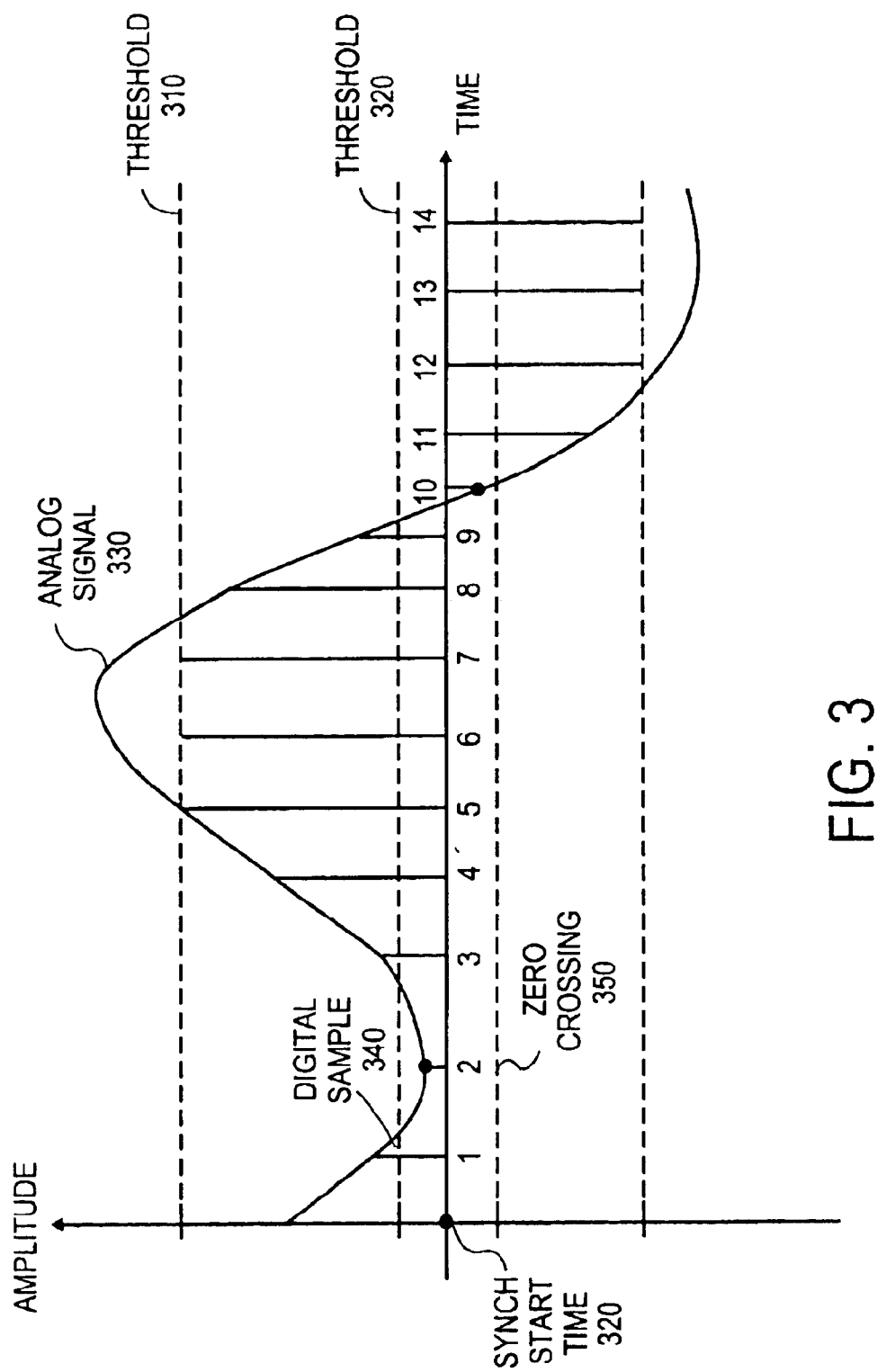
FIG. 3 illustrates one embodiment of a signal reflection.

In FIG. 2, an initial reflection is received at reflection input 215. In one embodiment, a reflection is a series of digitized samples of an analog signal. FIG. 3 illustrates one embodiment of a reflected analog signal 330. Digital samples 340 are taken at regular intervals with respect to time. Each digital sample is a representation of the amplitude of the analog signal at that particular instant in time. For instance, each sample may consist of a 12 bit value. A typical sampling rate is 32 MHz, or 32,000,000 samples per second.

Referring back to FIG. 2, the initial reflection is provided to zero capture comparator 210, comparators 220 and 230, and registers 240, 250, and 260. Since no previous reflections have been stored, collision detector 150 has no reflection to compare to, and cannot make a data collision determination. Erring on the side of caution, control logic 290 asserts the collision indication 295. Collision indication 295 is used to resolve a data collision in any number of ways. For instance, in response to assertion of the collision detection indication, the network device may back off for a random period of time and then try sending the data again.

In any event, the initial reflection should be stored for comparison to subsequent reflections. Storing the entire initial reflection would require a large amount of storage. For instance, even if only one millisecond of data needs to be stored, with 12 bit samples at a 32 MHz sampling rate, 32 thousand 12 bit samples would need to be stored. Rather than storing them all, the illustrated embodiment stores a representation of the reflection. Specifically, zero capture comparator 210 monitors the initial reflection for "zero crossings," such as zero crossing 350 in FIG. 3. That is, the value of each data sample is compared to substantially zero. If the value of the data sample is substantially zero, zero capture comparator 210 instructs register 260 to store the sample. Depending on the application and the degree of accuracy desired, different numbers of zero crossing can be stored. For instance, in one embodiment, the first 30 zero crossings are stored to represent a reflected signal. In another embodiment, the first 60 zero crossings are stored.

The digital samples are compared to "substantially" zero. That is, samples are taken at a particular frequency. As the amplitude of the analog signal approaches zero, samples may be taken before and after the actual zero crossing of the analog signal. For instance, in FIG. 3, none of the digital samples are exactly zero even though the analog signal crosses zero several times. In which case, zero capture comparator 210 compares the absolute value of each sample to a small threshold value 320 in order to capture samples near actual zero crossings.

The data points stored in register 260 include the location and value of the zero crossings. The location is an indication of where the data sample is with respect to a synchronized starting time for all reflected signals. The synchronized starting time is the time at which a network interface begins sampling a reflected signal with respect to the time the signal was first transmitted. That is, every time the network interface transmits an analog signal onto the network, the network interface begins sampling the reflection at the same time after the transmission begins. In this way, the samples from two different reflected signals correspond. In FIG. 3, every sample number 2, for instance, is in the same location in time with respect to the synchronized starting time 320. From FIG. 3, the zero crossings would be stored in register 260 as the locations of sample number 2 and sample number 10. The values would be whatever the digital representations are for those samples.

Of course, value ranges can be centered around values other than zero to represent reflected signals. For instance, samples could be compared to a positive or a negative value range. In practice however, reflected signals often saturate reflection input 215. That is, the analog value of the signal on the network may exceed the maximum value that a digital sample can represent. For instance, in FIG. 3, threshold 310 represents the maximum amplitude that a digital sample, such as a 12 bit sample, can represent. Where analog signal 330 exceeds threshold 310, all of the digital samples have the same value. If a value range is used for comparison that is outside the saturation range of the digital samples, the data collisions may be lost in the saturation. In which case, smaller values, such as zero tend to work best.

Returning to FIG. 2, once a set of zero crossing have been recorded in register 260, control logic 290 stops asserting collision indication 295 and prepares for receiving the second reflection by copying the set of zero crossings into registers 240 and 250. When the second reflection arrives, zero capture comparator again detects the zero crossings and instructs register 260 to store them for future reference.

At the same time, comparator 220 retrieves the initial set of zero crossings from register 240, and compares the value of each zero crossing to the value of the corresponding data sample from the second reflection. That is, since the data sampling of each reflected signal begins at a synchronized starting point, comparator 220 can select a data sample that has the same location in the second reflection as a previously stored zero crossing. Once the locations are matched up, the comparator takes the difference of the values of the two samples and compares the absolute value of the difference to a threshold value.

Using a threshold provides a margin for variation in the sample due to low level noise on the network, gradual changes in the network do to environmental changes like temperature and humidity, etc. If the difference between the values is less than the margin, comparator 220 just moves on to perform the same comparison using the next zero crossing. If the difference is more than the threshold value, comparator 220 indicates a discrepancy to counter 270.

Comparator 220 performs the same operation for each of the zero crossings and counter 270 counts the number of discrepancies. Comparator 230 performs the same operation using the zero crossing stored in register 250 and counter 280 counts the number of discrepancies. Since, the initial set of zero crossings where stored in both registers 240 and 250, the comparators will probably provide the same results. At this point, the second comparison is actually unnecessary, and in some embodiments, the comparator 230 may be disabled at this stage. As discussed below, the second comparator becomes important later.

Control logic 290 receives the numbers of discrepancies from counters 270 and 280. If the number of discrepancies is over a threshold value, control logic 290 asserts collision indication 295. If the discrepancies are below the threshold value, collision indication 295 is not asserted. Again, the threshold value of discrepancies provides for a margin of variation in the network due to noise, environmental changes over time, etc.

If the reflections match, collision detector 150 assumes there was no data collision. The set of zero crossings stored in register 260 is saved to registers 240 and 250 for comparison to the next reflection. By storing only the most resent set of zero crossings when no data collision is detected, collision detector 150 adapts to gradual changes in network characteristics. That is, as discussed above, various threshold values provide a margin for variation in the network. By always using the most recent reflection, collision detection adapts to changes over time, such as temperature changes over the course of the day.

If the reflections between the initial signal and the second signal do not match, collision detector 150 cannot determine if a data collision occurred during the first reflection or the second. In which case, control logic 290 copies the zero crossings from the second signal to register 250, but the zero crossings from the initial signal are retained in register 240.

When the third reflection is received, zero capture comparator 210 again detects zero crossings and instructions register 260 to store the zero crossing data points. Comparator 220 again compares the reflection to the set of zero crossings in register 240 and comparator 230 again compares the reflection to the set of zero crossings in register 250. If no data collision was detected for the second reflection, collision detector 150 handles the third reflection the same as the second reflection as discussed above because registers 240 and 250 contain the same set of zero crossings. That is, if the third reflection matches both, no collision is indicated. If the third reflection matches neither, a collision is indicated, and the zero crossings for the third collision are stored to register 250 and register 240 retains the zero crossings from the previous reflection.

If, however, a data collision was indicated with respect to the second reflection, registers 240 and 250 contain different sets of zero crossings. In which case, the number of discrepancies provided by counters 270 and 280 to control logic 290 should be different. Based on the discrepancies, control logic 290 makes a determination.

If the third reflection matches neither set of zero crossings, control logic 290 will assert collision indication 295. In this situation, three reflections in a row do not match. This is probably an indication of heavy network traffic or some rapid changes to the network characteristics. In any event, the zero crossings for the third reflection are copied from register 260 into both registers 240 and 250. When the next reflection arrives, it will be handled in the same fashion as the second reflection discussed above. That is, if the next reflection matches both, no collision is indicated, and the registers are all updated with the most recent zero crossings. If the next reflection matches neither, a collision is indicated, and one register is updated and one register maintains the previous zero crossings.

Referring again to the third reflection where a data collision was indicated with respect to the second reflection, if the third reflection matches one of the two sets of zero crossings based on the comparisons, control logic 290 assumes that the third reflection is not a data collision and copies the set of zero crossing stored in register 260 for the third reflection into registers 240 and 250 for future comparison. This is probably a safe assumption. It is very unlikely that two data collision reflections will match. This result means that the earlier reflection that matched the third reflection was really not a data collision, but there was no way to determine that for certain at the time. As a result, a frame of data may have been unnecessarily prevented from being transmitted, but that is a small price to pay for reliable data collision detection that can be used in virtually any network, including harsh network environments.

Using the three-reflection scenario as described above, collision detector 150 not only adapts to gradual and marginal variations in the network over time, but also adapts to large changes, such as adding or removing devices, damage to the network, etc. That is, collision detector 150 will continue to treat reflections as collisions until it gets two reflections that match. Any reflections earlier than the most recent three reflections are not considered. In which, even though a few frames of data may have to be unnecessarily resent when there are changes to the network, the collision detector quickly adapts to the changes.

Figure 4:
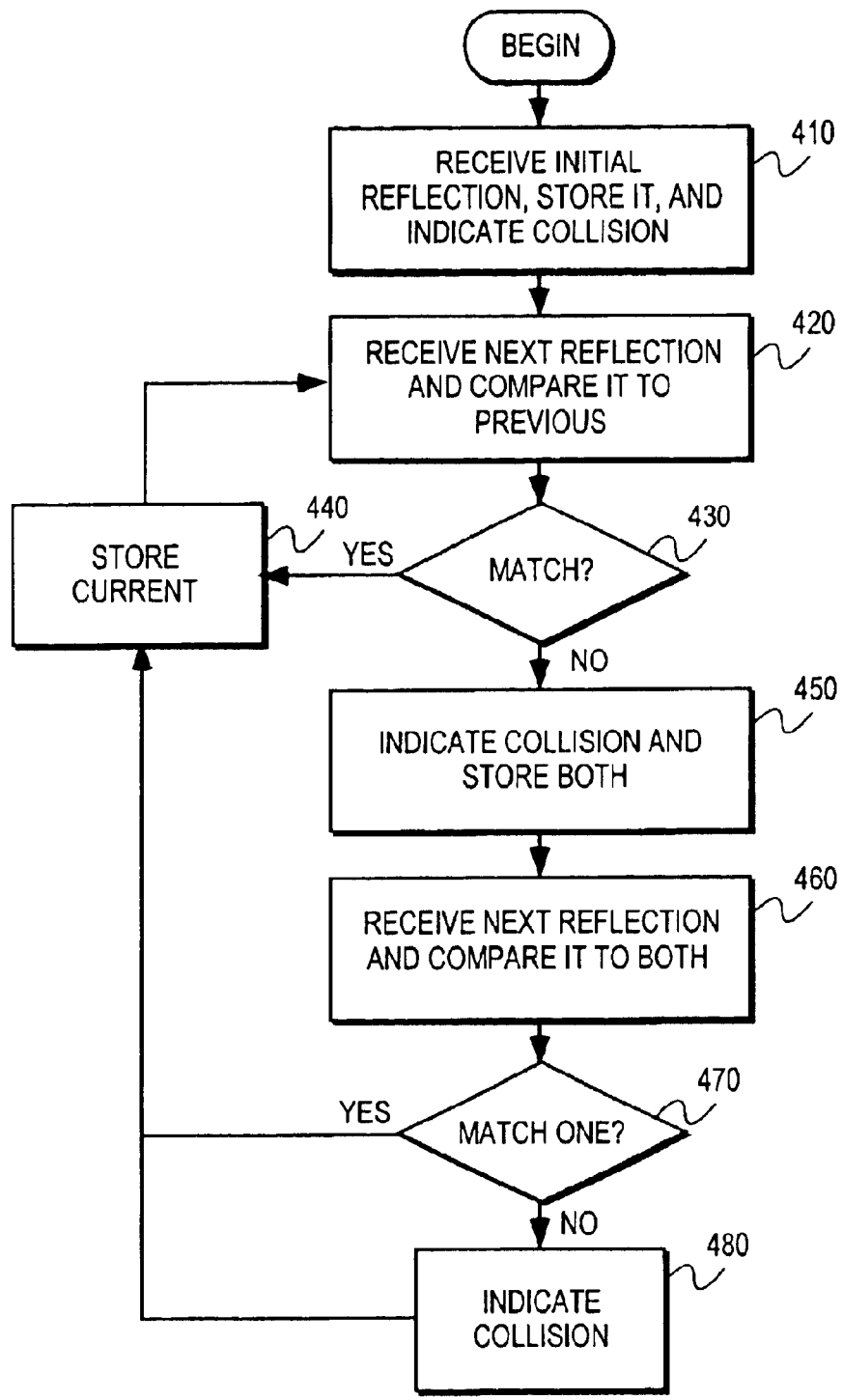
FIG. 4 demonstrates one embodiment of the invention.

FIG. 4 demonstrates one embodiment of the present invention. In block 410, an initial reflection is received. The reflection is stored (or an representation of the reflection is stored as discussed above) and a collision is indicated. A collision may not have actually occurred, but no previous reflection is stored for comparison purposes, so there may be no way of knowing one way or the other.

In block 420, the next reflection is received and compared to the previous reflection. In block 430, if the reflections match, the current reflection is stored in block 440 and the process returns to receive the next reflection in block 420. If, however, the reflections do not match in block 430, collision is indicated and both reflections are stored in block 450.

In block 460, the next reflection is received and compared to both stored reflections. In block 470, if the current reflection matches one of the two previously stored reflections, the current reflection is stored in block 440 and the process returns to block 420 to receive the next reflection. If the current reflection does not match one of the previously stored reflections in block 470, a collision is indicated in block 480, the current reflection is stored in block 440, and the process returns to block 420 to receive the next reflection.

Figure 5:
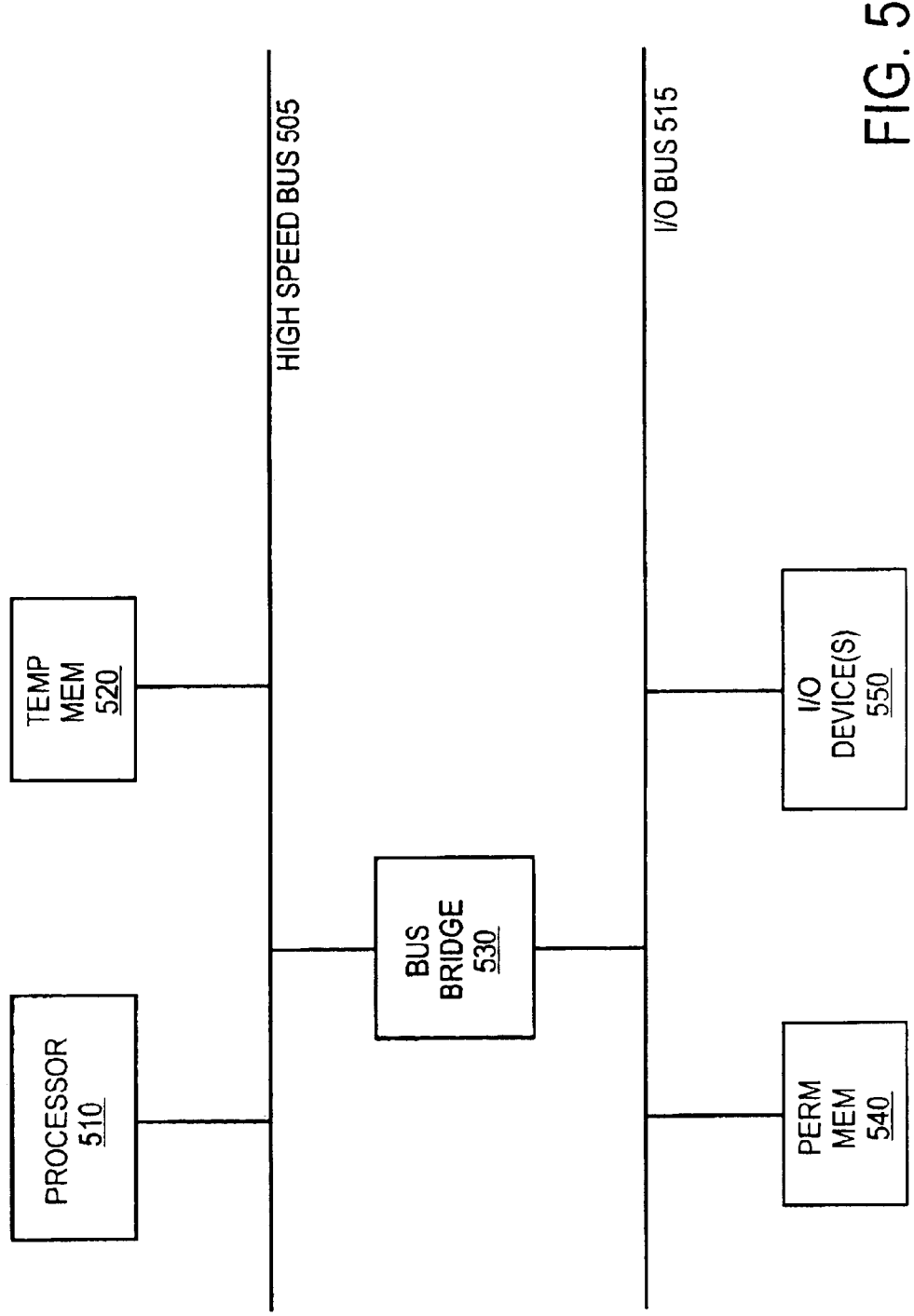
FIG. 5 illustrates one embodiment of a hardware system.

FIG. 5 illustrates one embodiment of a hardware system intended to represent a broad category of computer systems such as personal computers, workstations, and/or embedded systems. In the illustrated embodiment, the hardware system includes processor 510 coupled to high speed bus 505, which is coupled to input/output (I/O) bus 515 through bus bridge 530. Temporary memory 520 is coupled to bus 505. Permanent memory 540 is coupled to bus 315. I/O device(s) 550 is also coupled to bus 515. I/O device(s) 550 may include a display device, a keyboard, one or more external network interfaces, etc.

Certain embodiments may include additional components, may not require all of the above components, or may combine one or more components. For instance, temporary memory 520 may be on-chip with processor 510. Alternately, permanent memory 540 may be eliminated and temporary memory 520 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the collision detector, as described above, is implemented using one or more computers such as the hardware system of FIG. 5. Where more than one computer is used, the systems can be coupled to communicate over an external network, such as a local area network (LAN), an IP network, etc. In one embodiment, the present invention is implemented as software routines executed by one or more execution units within the computer(s). For a given computer, the software routines can be stored on a storage device, such as permanent memory 540.

Figure 6:
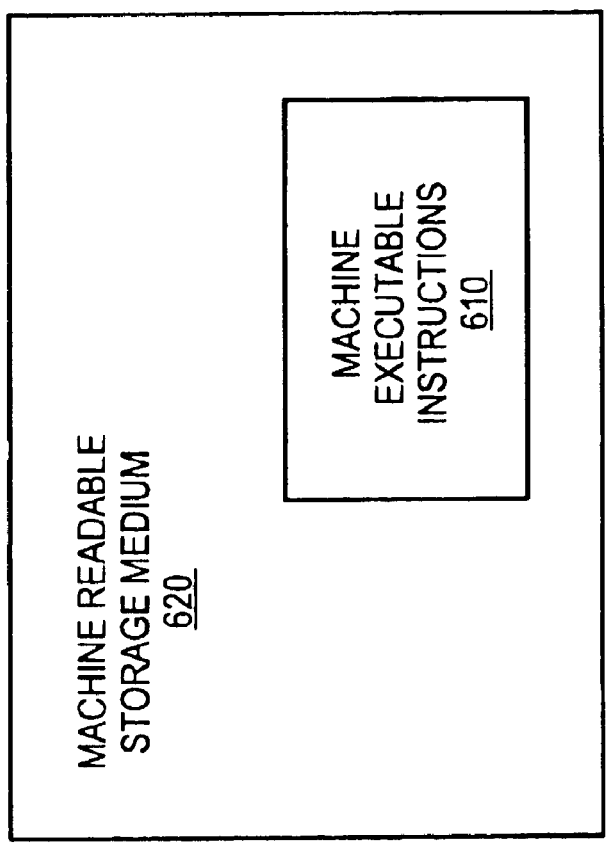
FIG. 6 illustrates one embodiment of a machine readable storage medium.

Alternately, as shown in FIG. 6, the software routines can be machine executable instructions 610 stored using any machine readable storage medium 620, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device 550 of FIG. 5.

From whatever source, the instructions may be copied from the storage device into temporary memory 520 and then accessed and executed by processor 510. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the collision detector. In another example, one or more functions of the collision detector could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a method and apparatus for data collision detection is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   transmitting a first signal into a network;
   capturing a representation of a second signal received from the network; said second signal containing a reflection of the first signal;
   transmitting a third signal into the network;
   capturing a representation of a fourth signal received from the network, said fourth signal containing a reflection of the third signal;

comparing the representation of the second signal to the representation of the fourth signal; and generating either a positive collision indication or a negative collision indication based at least in part on comparing the representations of the second and fourth signals.

2. The method of claim 1 wherein the representation of the second signal comprises a plurality of data points, and wherein each data point comprises a location and a value taken from the second signal.

3. The method of claim 1 further comprising:

adapting to changes in channel characteristics of the network based on comparing the representations of the second and fourth signals.

4. The method of claim 3 wherein adapting to changes is further based on at least one threshold for signal variation.

5. The method of claim 3 wherein the changes in channel characteristics are due to at least one of noise, temperature variation, humidity variation, and deterioration of the network over time.

6. The method of claim 1 wherein capturing the representation of the second signal comprises:

comparing a value of each of a plurality of data samples comprising the second signal to a particular value; and recording a location and a value of each data sample that is within a threshold range of the particular value.

7. The method of claim 6 wherein the particular value is one of zero and a value less than a saturation value of each data sample.

8. The method of claim 6 wherein each pair of one location and one corresponding value comprises a data point, and wherein recording comprises recording a limited number of data points for the representation of the second signal.

9. The method of claim 1 wherein the positive collision indication indicates one or both of a data collision on the network and a channel characteristic change in the network.

10. The method of claim 1 wherein at least a portion of the first signal comprises a particular signal pattern and the representation of the second signal is based on at least a portion of the particular signal pattern contained in the reflection of the first signal, and wherein at least a portion of the third signal also comprises the particular signal pattern and the representation of the fourth signal is based on at least a portion of the particular signal pattern contained in the reflection of the third signal.

11. The method of claim 10 wherein comparing the representations of the second and fourth signals comprises:

comparing the particular signal pattern from the representation of the second signal to the particular signal pattern from the representation of the fourth signal.

12. A method comprising:

receiving a first signal reflected from a network;

comparing the first signal to a representation of a previously reflected signal; and generating either a positive collision indication or a negative collision indication based at least in part on comparing the first signal to the representation of the previously reflected signal, wherein the representation of the previously reflected signal comprises a plurality of data points, and wherein each data point comprises a location and a value taken from the previously reflected signal, and wherein comparing the first signal to the representation of the previously reflected signal comprises:

selecting a plurality of data samples from the first signal, said first signal and said previously reflected signal having synchronized starting points such that a location of each of said data samples corresponds to a location of one of said data points with respect to the synchronized starting points;

determining an absolute value of a difference between a value of each of the data samples and a value of each of the corresponding data points;

comparing each absolute value to a first threshold value; and advancing a counter value for each absolute value that exceeds the threshold value.

13. The method of claim 12 wherein generating either the positive collision indication or the negative collision indication comprises:

generating the positive collision indication if the counter value exceeds a second threshold value.

14. A method comprising:

receiving a first signal reflected from a network;

comparing the first signal to a representation of a previously reflected signal;

generating either a positive collision indication or a negative collision indication based at least in part on comparing the first signal to the representation of the previously reflected signal; and storing a representation of the first signal, wherein if the positive collision indication is generated with respect to the first signal, the method further comprises:

receiving a second signal reflected from the network;

comparing the second signal to the representation of the previously reflected signal;

comparing the second signal to the representation of the first signal;

generating either the positive collision indication or the negative collision indication with respect to the second signal based at least in part on comparing the second signal to the representation of the previously reflected signal and comparing the second signal to the representation of the first signal;

storing a representation of the second signal if the negative collision indication is generated; and storing the representation of the second signal and at least one of the representation of the previously reflected signal and the representation of the first signal if the positive collision indication is generated.

15. The method of claim 14 wherein the negative collision indication is generated if the second signal matches at least one of the representation of the previously reflected signal and the representation of the first signal.

16. A method comprising:

receiving a first signal reflected from a network;

comparing the first signal to a representation of a previously reflected signal;

generating either a positive collision indication or a negative collision indication based at least in part on comparing the first signal to the representation of the previously reflected signal; and storing a representation of the first signal, wherein if the negative collision indication is generated with respect to the first signal, the method further comprises:

receiving a second signal reflected from the network;

comparing the second signal to the representation of the first signal;

generating either the positive collision indication or the negative collision indication with respect to the second signal based at least in part on comparing the second signal to the representation of the first signal;

storing a representation of the second signal if the negative collision indication is generated; and storing the representation of the second signal and the representation of the first signal if the positive collision indication is generated.

17. An apparatus comprising:

a transmitter to transmit a first signal and a second signal into a network;

a comparator to capture a representation of a third signal received from the network, said third signal containing a reflection of the first signal, said comparator to capture a representation of a fourth signal received from the network, said fourth signal containing a reflection of the second signal, and said comparator to compare the representation of the third signal to the representation of the fourth signal; and control logic to generate either a positive collision indication or a negative collision indication based at least in part on a result from the comparator.

18. The apparatus of claim 17 wherein the comparator comprises:

a comparison unit to receive the third signal from the network and to compare a value of each of a plurality of data samples comprising the third signal to a particular value; and a register to store the representation of the third signal, said representation of the third signal comprising a location and a value of each data sample of the plurality of data samples that is within a threshold range of the particular value as indicated by the comparison unit.

19. The apparatus of claim 17 wherein the representation of the third signal comprises a plurality of data points, and wherein each data point comprises a location and a value taken from the third signal.

20. The apparatus of claim 17 wherein the positive collision indication indicates one or both of a data collision on the network and a channel characteristic change in the network.

21. An apparatus comprising:

a first comparator to receive a first signal reflected from a network and to compare the first signal to a representation of a previously reflected signal; and control logic to generate either a positive collision indication or a negative collision indication based at least in part on a result from the first comparator, wherein the representation of the previously reflected signal comprises a plurality of data points, and wherein each data point comprises a location and a value taken from the previously reflected signal, and wherein, to receive the first signal and compare the first signal to the representation of the previously reflected signal:

said first comparator is to select a plurality of data samples from the first signal, said first signal and said previously reflected signal having synchronized starting points such that a location of each of said data samples corresponds to a location of one of said data points with respect to the synchronized starting points; and said first comparator further to determine an absolute value of a difference between a value of each of the data samples and a value of each of the corresponding data points, and to compare each absolute value to a first threshold value.

22. The apparatus of claim 21 further comprising:

a counter to advance a counter value for each absolute value that exceeds the threshold value as indicated by the first comparator.

23. The apparatus of 22 wherein the control logic is to generate the positive collision indication if the counter value exceeds a second threshold value.

24. An apparatus comprising:

a first comparator to receive a first signal reflected from a network and to compare the first signal to a representation of a previously reflected signal; and control logic to generate either a positive collision indication or a negative collision indication based at least in part on a result from the first comparator, wherein if the positive collision indication is generated with respect to the first signal, the apparatus further comprises:

a second comparator, both said first comparator and said second comparator to receive a second signal reflected from the network, said first comparator to compare the second signal to the representation of the previously reflected signal, and said second comparator to compare the second signal to a representation of the first signal;

said control logic to generate either the positive collision indication or the negative collision indication with respect to the second signal based at least in part on results from the first and second comparators.

25. The apparatus of claim 24 further comprising:

a plurality of registers to store a representation of the second signal if the negative collision indication is generated, and to store the representation of the second signal and at least one of the representation of the previously reflected signal and the representation of the first signal if the positive collision indication is generated.

26. The apparatus of claim 24 wherein the negative collision indication is generated if the second signal matches at least one of the representation of the previously reflected signal and the representation of the first signal.

27. An apparatus comprising:

a first comparator to receive a first signal reflected from a network and to compare the first signal to a representation of a previously reflected signal; and control logic to generate either a positive collision indication or a negative collision indication based at least in part on a result from the first comparator, wherein, if the negative collision indication is generated with respect to the first signal:

said first comparator is to receive a second signal reflected from the network and to compare the second signal to a representation of the first signal; and said control logic is to generate either the positive collision indication or the negative collision indication with respect to the second signal based at least in part results from the first comparator.

28. The apparatus of claim 27 further comprising:

a plurality of registers to store a representation of the second signal if the negative collision indication is generated, and to store the representation of the second signal and the representation of the first signal if the positive collision indication is generated.

29. A machine accessible medium to provide access to machine executable instructions, the execution of said machine executable instructions to implement a method comprising:

transmitting a first signal into a network;

capturing a representation of a second signal received from the network, said second signal containing a reflection of the first signal;

transmitting a third signal into the network;

capturing a representation of a fourth signal received from the network, said fourth signal containing a reflection of the third signal;

comparing the representation of the second signal to the representation of the fourth signal; and generating either a positive collision indication or a negative collision indication based at least in part on comparing the representations of the second and fourth signals.

30. The machine accessible medium of claim 29 wherein at least a portion of the first signal comprises a particular signal pattern and the representation of the second signal is based on at least a portion of the particular signal pattern contained in the reflection of the first signal, and wherein at least a portion of the third signal also comprises the particular signal pattern and the representation of the fourth signal is based on at least a portion of the particular signal pattern contained in the reflection of the third signal.

31. The machine accessible medium of claim 30 wherein comparing the representations of the second and fourth signals comprises:

comparing the particular signal pattern from the representation of the second signal to the particular signal pattern from the representation of the fourth signal.

32. A machine accessible medium to provide access to machine executable instructions, the execution of said machine executable instructions to implement a method comprising:

receiving a first signal reflected from a network;

comparing the first signal to a representation of a previously reflected signal; and generating either a positive collision indication or a negative collision indication based at least in part on comparing the first signal to the representation of the previously reflected signal, wherein if the positive collision indication is generated with respect to the first signal, the method further comprises:

receiving a second signal reflected from the network;

comparing the second signal to the representation of the previously reflected signal;

comparing the second signal to a representation of the first signal;

generating either the positive collision indication or the negative collision indication with respect to the second signal based at least in part on comparing the second signal to the representation of the previously reflected signal and comparing the second signal to the representation of the first signal;

storing a representation of the second signal if the negative collision indication is generated; and storing the representation of the second signal and at least one of the representation of the previously reflected signal and the representation of the first signal if the positive collision indication is generated.

33. A machine accessible medium to provide access to machine executable instructions, the execution of said machine executable instructions to implement a method comprising:

receiving a first signal reflected from a network;

comparing the first signal to a representation of a previously reflected signal; and generating either a positive collision indication or a negative collision indication based at least in part on comparing the first signal to the representation of the previously reflected signal, wherein if the negative collision indication is generated with respect to the first signal, the method further comprises:

receiving a second signal reflected from the network;

comparing the second signal to a representation of the first signal;

generating either the positive collision indication or the negative collision indication with respect to the second signal based at least in part on comparing the second signal to the representation of the first signal;

storing a representation of the second signal if the negative collision indication is generated; and storing the representation of the second signal and the representation of the first signal if the positive collision indication is generated.

* * * * *